(12) United States Patent
King, Jr.

(10) Patent No.: US 6,601,605 B2
(45) Date of Patent: Aug. 5, 2003

(54) LOCKING END CAP

(75) Inventor: Lloyd Herbert King, Jr., Chesterfield, MO (US)

(73) Assignee: King Technology of Missouri Inc., St. Charles, MO (US)

(*) Notice: Subject to any disclaimer, the term of this patent is extended or adjusted under 35 U.S.C. 154(b) by 0 days.

(21) Appl. No.: 09/918,131

(22) Filed: Jul. 30, 2001

(65) Prior Publication Data

US 2001/0054439 A1 Dec. 27, 2001

Related U.S. Application Data

(63) Continuation-in-part of application No. 09/785,684, filed on Feb. 16, 2001.
(60) Provisional application No. 60/183,612, filed on Feb. 18, 2000.

(51) Int. Cl.$^7$ .................... F16L 37/26; F16L 37/38; F16L 37/48
(52) U.S. Cl. ............... 137/318; 137/15.14; 137/15.17; 222/83; 222/91; 408/102; 408/138; 285/197
(58) Field of Search .................. 30/93; 137/317, 137/318, 15.13, 15.14, 15.17; 315.17; 222/83, 91; 408/101, 102, 137, 138; 285/197

(56) References Cited

U.S. PATENT DOCUMENTS

| | | | | | |
|---|---|---|---|---|---|
| 3,343,724 A | * | 9/1967 | Malpas | ..................... | 137/318 |
| 3,460,715 A | * | 8/1969 | Lane et al. | .................. | 137/318 |
| 4,108,194 A | * | 8/1978 | Harrison et al. | ............ | 137/318 |
| 4,112,944 A | * | 9/1978 | Williams | ..................... | 137/318 |
| 5,105,844 A | * | 4/1992 | King, Sr. | ..................... | 137/318 |
| 5,609,181 A | * | 3/1997 | Evans | ....................... | 137/318 |
| 5,694,972 A | * | 12/1997 | King | .......................... | 137/318 |
| 6,216,723 B1 | * | 4/2001 | King | .......................... | 137/318 |
| 6,357,472 B1 | * | 3/2002 | King | .......................... | 137/318 |

\* cited by examiner

Primary Examiner—George L. Walton
(74) Attorney, Agent, or Firm—Jacobson & Johnson

(57) ABSTRACT

An end-cap lockingly securable to the end of the pipe at the same time a secondary action such as a branch line is formed to the main pipe line. The end cap housing has an integral branch forming member to allow a user to lock the end cap to the pipe by forming a branch line on the side of the pipe with the end cap housing sandwiching the end of a pipe between a pipe insert and a pipe receptor in the end cap housing. The pipe receptor includes an insert having a sealing surface, which when engaged to the interior surface of a pipe, forms a leak-proof relationship with the pipe.

22 Claims, 2 Drawing Sheets

LOCKING END CAP

CROSS REFERENCE TO RELATED APPLICATIONS

This application is a continuation-in-part of Ser. No. 09/785,684; filed on Feb. 16, 2001, which claims priority to provisional application No. 60/183,612; filed on Feb. 18, 2000.

STATEMENT REGARDING FEDERALLY SPONSORED RESEARCH OR DEVELOPMENT

None

REFERENCE TO A MICROFICHE APPENDIX

None

FIELD OF THE INVENTION

This invention relates generally to end-caps and, more specifically, to an end cap lockingly secureable in a leak-proof seal to a main line at the same time a secondary action such as a branch line is formed to the main line.

BACKGROUND OF THE INVENTION

The concept of forming branch attachments to rigid and plastic tubing is known in the art. Generally, pipe saddles are fastened around a pipe so that one can connect a branch tubing to a main tubing. Attaching a branch tubing to a main tubing often requires numerous steps and sometimes it is difficult to adequately seal the junction between the branch tubing and the main tubing.

Most branch attaching device usually comprises two parts, a tap for forming the opening in the pipe and a saddle for holding the main tubing and the branch tubing in fluid communication. In one application shown in U.S. Pat. No. 5,105,844 a tap or cutter having a through passage both cuts a hole and forms a side attachment for the pipe. In the cutter shown in U.S. Pat. No. 5,105,844 a coupon or plug is cut free of the pipe and is frictionally retained within the cutter so as not to interfere with or block the passageway in the pipe.

While branch lines need to be formed to a pipe line it is also necessary to cap off the end of a pipe. In order to cap the end of a pipe an end cap is secured to the end of the pipe usually by an adhesive or mechanical attachment. Either method requires separate and additional steps to secure the end cap to the end of the pipe. The present invention provides a locking end-cap securable to the end of the pipe at the same time a secondary action such as a branch line is formed to the main pipe line thereby eliminating the step of separately attaching an end cap to a pipe line.

SUMMARY OF THE INVENTION

Briefly, the invention comprises an end-cap lockingly securable to the end of the pipe at the same time a secondary action such as a branch line is formed to the main pipe line. The end cap housing has an integral branch forming member to allow a user to lock the end cap to the pipe by forming a branch line on the side of the pipe with the end cap housing sandwiching the end of a pipe between a pipe insert and a pipe receptor in the end cap housing. The pipe receptor includes an insert having a sealing surface, which when engaged to the interior surface of a pipe, forms a leak-proof relationship with the pipe.

DESCRIPTION OF THE PREFERRED EMBODIMENT

Figure 1:
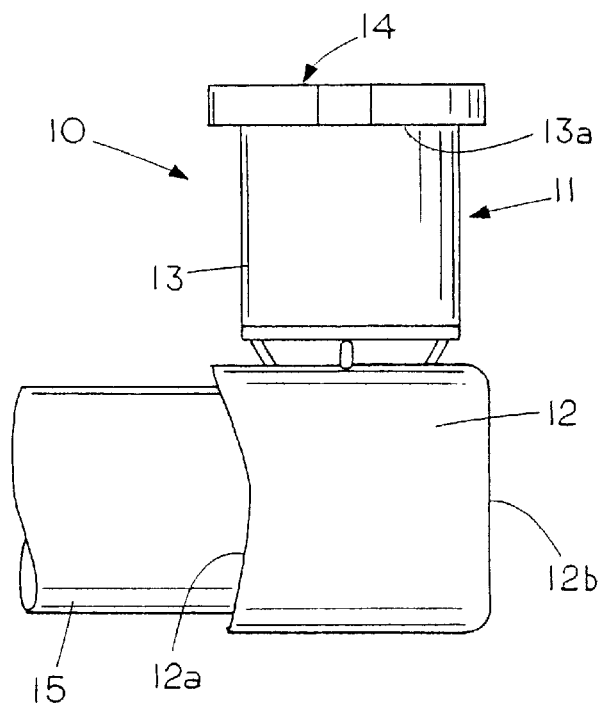
FIG. 1 is a side view of the locking end cap and a tap member.

FIG. 1 reference numeral 10 generally identifies a locking end-cap of the present invention which is engaged with and carried by the end of a pipe 15. In the embodiment shown the locking end-cap 10 is composed of high-density polyurethane. Although polyurethane is the material of choice for the present invention other materials can be used with the present invention. Locking end-cap 10 comprises two parts, a one-piece, integral housing 11 and a tap member 14. The housing 11 includes a cylindrical pipe receptor 12 having an open-end 12a and a closed-end 12b and a cylindrical tap receptor 13 having a tap receiving end 13a. Pipe receptor 12 fits over the end of pipe 15 and extends axially therealong while tap receptor 13 projects radially outward from pipe receptor 13 to enable an operator to form a branch attachment to pipe 15.

Figure 2:
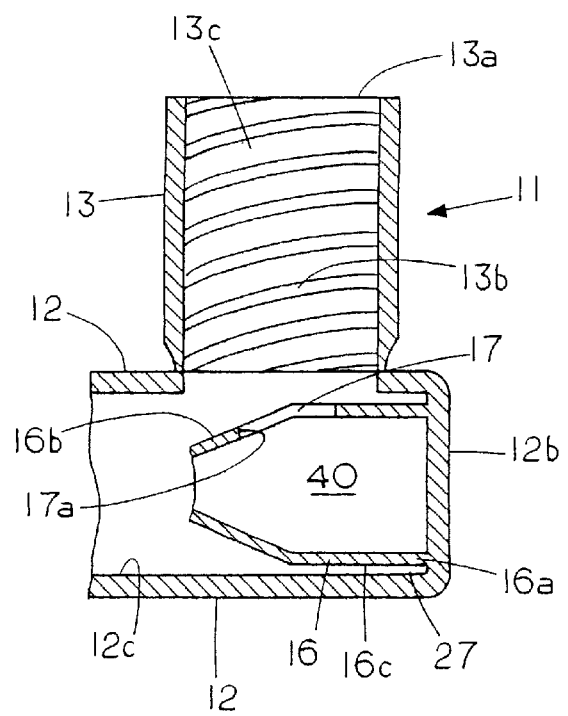
FIG. 2 is a cross-sectional view of the housing of the locking end cap of FIG. 1 without the tap member.

FIG. 2 is a cross-sectional view of the one-piece, integral housing 11 of the locking end cap 10 of FIG. 1. Located within housing 11 is a cylindrical tap receptor 13 having a passageway 13c leading from the tap receiving end 13a of tap receptor 13 to pipe receptor 12. The interior wall of tap receptor 13 has a set of female threads 13b for rotatingly engaging a tap member 14, shown in FIG. 3, as the tap member 14 is rotated about a central axis by the rotation of the tap member hand grip or handle 19.

Located within pipe receptor 12 is a cylindrical plug or insert 16 for forming a leak-proof seal to the end of a pipe. Plug or insert 16 has a first end 16a and a second conical tapered end 16b. The purpose of the conical taper is to facilitate the beginning engagement of insert 16 within pipe 15. Insert 16 cantilevers outward from the closed-end 12b of pipe receptor 12 so as to extend axially inward into the interior of the end of pipe 15. The outer cylindrical surface of insert 16 has an annular sealing surface 16c, which forms a leak-proof seal with an interior surface of a pipe 15 when outer insert annular sealing surface 16c engages an interior wall surface of a pipe 15.

Located on insert 16 proximal to passageway 13c of tap receptor 13 is an orifice 17 for receiving a portion of tap member 14. In the current embodiment insert 16 has a hollow interior 40 although a non-hollow interior can be used. Insert 16 is positioned at a right angle to tap receptor 13 to allow for locking engagement between an end portion of tap member 13 and insert 16 when tap member 14 extends into orifice 17. Orifice 16 is spaced sufficiently far from end 14b so as not to interfere with the sealing relationship formed between the end of pipe 15 and insert 16. Located between insert 16 and the walls of pipe receptor 12 is an annular pipe recess 27 formed by the inside surface of pipe receptor 13 and the exterior sealing surface 16c. The annular recess 27 has sufficient width so as to accommodate the end of a pipe therein and forms a guide for engaging the insert 16 with the end of a pipe. When a pipe is located in recess 27 the pipe receptor interior surface 12c and the insert exterior surface 16c coact to frictionally engage and support the insert 16 in a leak-proof relationship on the end of pipe 15. In an alternate sealing relationship an interior surface 12c of pipe receptor could form a sealing relationship with the end of pipe 15. The penetrating engagement of tap member 14 with insert 16 helps to maintain insert 16 and pipe 15 in a leak-proof engagement, especially under high water pressure conditions.

Figure 3:
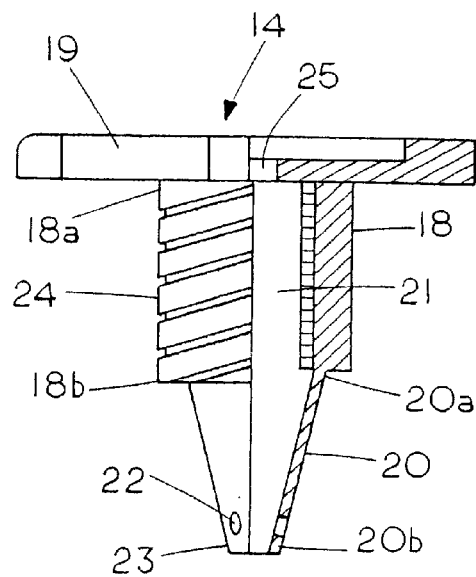
FIG. 3 shows a partial cross-sectional view of a tap member.

FIG. 3 shows a partial sectional view of tap member 14 with a drum 18 having a first end 18a and a second end 18b. Located on the exterior of drum 18 is a set of male threads 24 for rotatingly engaging tap receptor 13. Extending from the first end 18a of drum 18 is a handle 19 for enabling a user to grasp and rotate drum 18. Located within handle 19 and directly next to passageway 21 is an outlet 25. Connected to the second end 18b of drum 18 is a cutting tube 20 having a first end 20a and a second end 20b. Cutting tube 20 is connected to drum 18 at the first end 20a of cutting tube 20 and the second end 18b of drum 18. Located at the second end 20b of the cutting tube 20 is a cutting device 23, which is rotationally driven through a sidewall 15a of pipe 15 to form a self sealing hole on wall 15a of pipe 15 (shown in FIG. 4). Also located proximal second end 20b of cutting tube 20 is at least one inlet 22 for to form fluid communication through passageway 21 of cutting tube 20. Tap member 14 is more thoroughly described in the pending parent application titled Coupling Cutter, Ser. No. 60/183, 612 and filing date Feb. 16, 2001.

Figure 4:
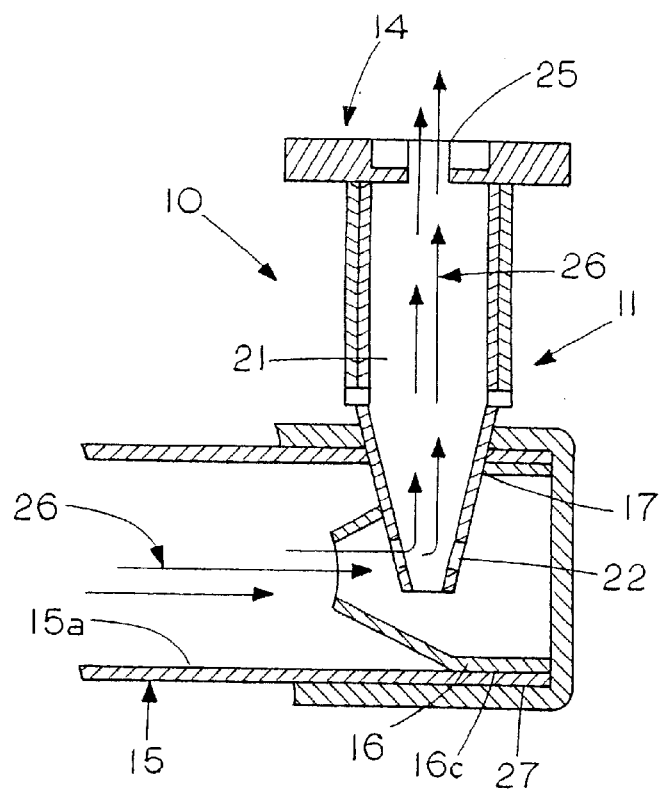
FIG. 4 shows a cross-sectional view of the locking end cap and tap member of FIG. 1.

FIG. 4 is a cross-sectional view of FIG. 1 showing the locking engagement of the housing 11 and tap member 14 as fluids flow from the main pipe 15 flows thorough a branch outlet 23 in tap member 14. As shown, pipe wall 15a is shown frictionally engaging the exterior surface of insert 16 forming a leak-proof or fluid-proof seal between the surfaces of pipe wall 15a and insert 16. The engagement between pipe wall 15a and insert 16 also prevents radial displacement of pipe 15. Tap member 14 is shown extending into wall 15a and engaging insert 16 to thereby hold end-cap 10 on pipe 15. The coaction between tap member 14, insert 16 and pipe 12 prevents axial displacement of insert 14 thus ensuring that the insert 16 is maintained in a sealing relationship with the end of pipe 15.

A fluid, represented by set of arrows 26 is shown originating from pipe 15 and flowing into passageway 21 of tap member 13 by way of tap member inlet 22 and exiting by passageway 21 by way of tap member outlet 25. FIG. 4 shows that tap member 14 extends through pipe 15 with the end of tap member 12 extending into the orifice 17 in insert 16. Consequently, end-cap 10 will not dislodge from pipe 15 even in a high water pressure condition due to the locking engagement of tap member 13 with both pipe 15 and insert 16.

In operation of the invention a user slides pipe receptor 12 of housing onto an end of a pipe 15. A slight tap or force on the end 12b of pipe receptor drives insert 16 into sealing engagement with pipe 15. Although pipe 15 and insert are in sealing relationship pressure in the pipe 15 could force the insert 16 out of the end of the pipe 15. To avoid the axial displacement of insert 16 the operator extends the tap member 14 into the tap receptor 13. That is, by rotation of the tap member 14 the operator can create a self-sealing opening through a sidewall of the pipe to form a branch attachment to the pipe and at the same time bring the tap member 14 into mechanical engagement with insert 16. This sandwiches the sidewall of the pipe 15 between the insert 16 and the pipe receptor 12. Thus the end cap can be lockingly sealed to the end of a pipe at the same time a branch line is being formed to the pipe. If insert 16 includes an orifice 17 the tap member 14 can engage the sidewalls 17a of orifice 17 to thereby sandwich the sidewall of pipe between insert 16 and pipe receptor surface 12c.

In the embodiment shown insert 16 is include with an orifice 17 to enable tap member 14 to be extended therethrough. It is envisioned that insert 16 need not have an insert and the tap member 14 could be used to also form the opening therethrough in a manner the tap member 14 forms an opening through sidewall 15.

Thus, the applicant's invention includes an end-cap securable to a pipe as another action or operation is performed to the pipe. In one method, one simultaneously attaches an end-cap 10 in a leak-proof seal between a pipe and end-cap 10 and for forming a branch line to a main line when a self sealing opening is made in the sidewall of a pipe. In this method the end cap insert 16 is held in a locked position by the sandwiching of the sidewall of the pipe between the pipe receptor 12 and the insert 16 and the transverse extension of the tap member 14 through all three members.

This present invention also comprises a method of simultaneously attaching an end-cap 10 and forming a branch attachment. The steps of first inserting a pipe receptor 12 of a end-cap 10 onto the end of a pipe 15 and extending the insert 16 into the end of the pipe 15 to thereby form a leak-proof seal between the pipe and the insert and secondly, rotationally extending the tap member 14 though the sidewall of pipe 15 to engage an insert 16 to thereby prevent axial displacement of the insert with respect to pipe 15 as well as create a leak-proof relationship between the insert 16 and the interior walls of pipe 15.

In order to ensure that a seal is formed between the end of the pipe and the insert the user may have to first square of the end of pipe 41 in order to allow inner surface area of pipe wall 15 form frictional engagement to the exterior sealing surface of insert 16. In the preferred embodiment the use of a slight interference fit between insert 16 and pipe 15 ensures that a leak-proof seal is formed therebetween while the transverse extension of tap member 14 through the pipe sidewall ensures that the insert 16 will not be axially displaced with respect to the pipe 15. Although a leak-proof seal is obtained by the mating of surfaces of insert 16 and pipe 15 it is envisioned that other methods of sealing such as the use of gaskets or the like could be used.

Thus the present invention comprises an end-cap that is incidentally lockable to a pipe with the end-cap comprising a housing having a first member for forming a functional engagement with a pipe, such as a branch attachment, and a second member comprising a pipe receptor located in the housing with the pipe receptor having a surface for forming a leak-proof seal on the end of a pipe so that when a further member, such as a tap member, is inserted into the housing to bring the first member into functional engagement it incidentally but simultaneously secures the end cap in locked relationship to the end of the pipe with the first member radially positioned from the pipe receptor.

I claim:

1. An end-cap incidentally lockable to a pipe comprising:
   a. a housing for engagement with a pipe, said housing having a first member;
   b. said housing having a pipe receptor, said pipe receptor having an open end and a closed end for forming a leak-proof seal on an open circumferential end of said pipe when the pipe is inserted therein; and
   c. a further member for incidentally securing the pipe in locked relationship to the closed end of the pipe receptor as the further member is moved through the first member into engagement with the pipe.

2. The end-cap of claim 1 including a pipe receptor wall and an insert, said insert having an external surface that sealing engages an interior surface portion of the open circumferential end of said pipe, said pipe receptor wall and said insert forming a pipe sidewall engaging recess therebetween.

3. The end-cap of claim 1 including an insert having an external surface that sealing engages an interior surface portion of the open circumferential end of said pipe, said insert having an orifice, said orifice located in said insert proximal to a passageway of said first member for receiving a portion of the further member to maintain locking engagement of the pipe to said insert.

4. The end-cap of claim 3 wherein said insert is located at a right angle to the first member and the first member comprises a tap receptor.

5. The end-cap of claim 3 wherein the insert has a conical taper.

6. The end-cap of claim 3 wherein said insert has a hollow interior.

7. The end cap of claim 1 wherein the further member comprises:
 a. a drum, said drum having a first end and a second end, said drum having a passageway located within said drum and extending from the first end to the second end of said drum;
 b. a handle extending from the first end of said drum to enable a person to grasp and rotate the drum; and
 c. a pipe penetrating tube, said pipe penetrating tube having a first end connected to said drum and a second end extending outwardly from said drum; the second end of said pipe penetrating tube having an inlet for passage of a fluid through the pipe penetrating tube, said second end of the tube rotationally driveable through a sidewall of a pipe to form a self sealing hole therein.

8. The end-cap of claim 6 wherein the cutting tube includes a first inlet and a second inlet located proximate the second end of said cutting tube to form fluid communication thought a passage in the cutting tube.

9. The end-cap of claim 1 wherein said further member comprises a tap member.

10. The end-cap of claim 9 wherein the tap member includes an end for extending through the sidewall of the pipe to form a self-sealing hole in the sidewall of the pipe.

11. An end-cap lockingly securable to a pipe comprising:
 a. a housing, said housing having a pipe receptor and a tap receptor, said pipe receptor having a closed end and an open end for receiving an end of a pipe, said tap receptor having a passageway located within said tap receptor;
 b. a tap member;
 c. a hollow insert, said insert located within the pipe receptor and cantileverly attached to the closed end of the pipe receptor, said insert located radially to the tap receptor, said insert having a tapered end located distal to the closed end of the pipe receptor, said insert having an orifice located proximal to the passageway of said tap receptor for receiving a portion of a tap member to lockingly retain the pipe within the pipe receptor against the closed end of the pipe receptor; and
 d. a sealing surface, said sealing surface located on an exterior surface of said insert, said sealing surface creating a leak-proof seal with an interior surface of a pipe, said end-cap secured in a leak-proof condition by the engagement of the tap member to said insert to provide for communicating flow through the pipe into the insert and through the tap member.

12. The end-cap of claim 11 wherein the tap member comprises:
 a. a drum;
 b. a handle extending from said drum to enable a person to grasp and rotate the drum; and
 c. a cutting tube, said cutting tube having a first end connected to said drum and a second end extending outwardly from said drum; the second end of said cutting tube having an orifice for passage of a fluid through the cutting tube, said second end of the tube having a cutting device which is rotationally driven through a sidewall of the pipe to form a hole on the wall of said pipe.

13. The end-cap of claim 12 wherein the tap member includes an end for forming a self sealing hole in the pipe.

14. The end-cap of claim 12 wherein said tap receptor having a set of female threads for rotatingly engaging said tap member as said tap member is rotated about a central axis.

15. The end-cap of claim 12 wherein the exterior of said drum having a set of external male thread for rotatingly engaging said tap receptor.

16. The end-cap of claim 12 wherein the cutting tube includes a first inlet and a second inlet located proximate the second end of said cutting tube to form fluid communication thought a passage in the cutting tube.

17. The end-cap of claim 12 wherein the handgrip has an opening therein to provide threading access to a female thread to enable securement of a branch line thereto.

18. A method of simultaneously forming a branch attachment and securing an end-cap to a pipe comprising the steps of:
 a. extending an insert into the end of a pipe to form a leak-proof seal between an interior surface of the pipe and an exterior surface of the insert; and
 b. extending a branch forming tap member through an orifice in a sidewall of the pipe and into engagement with the insert to thereby simultaneously form a branch attachment and lock the insert to the pipe to provide for communicating flow through the pipe into the insert and through the tap member.

19. The method of claim 18 including the step of first squaring off the end of a pipe.

20. The method of claim 18 including the step forming a frictional engagement between the insert and the pipe.

21. The method of claim 18 including rotationally driving the branch forming tap member through a sidewall of a pipe to form a self-sealing hole on the wall of said pipe.

22. An end-cap securable to a pipe as another operation is performed to the pipe comprising:
 a. a tap receptor, said tap receptor having a tap receiving end for receiving a tap, said tap receptor having a passageway located within said tap receptor;
 b. a pipe receptor, said pipe receptor having a closed end and an open end for receiving an end of a pipe;
 c. an insert, said insert having a first end and a second end, said insert connected to the closed end of the pipe receptor by the first end of said insert; and
 d. a sealing surface, said sealing surface located on an exterior surface of said insert, said sealing surface creating a leak-proof seal with an interior pipe surface, said end-cap securable in a leak-proof condition by the engagement of a tap member with said pipe and said insert.

* * * * *